United States Patent [19]

Kubota

[11] 4,284,684
[45] Aug. 18, 1981

[54] MAGNETIC RECORDING MEDIUM AND METHOD OF MANUFACTURING THE SAME

[75] Inventor: Yuichi Kubota, Komoro, Japan

[73] Assignee: TDK Electronic Co., Ltd., Tokyo, Japan

[21] Appl. No.: 20,143

[22] Filed: Mar. 13, 1979

[30] Foreign Application Priority Data

Mar. 16, 1978 [JP] Japan .................................. 53-29247

[51] Int. Cl.$^3$ .............................................. H01F 10/02
[52] U.S. Cl. ................................. 428/328; 252/62.55; 360/134; 360/135; 427/132; 428/418; 428/461; 428/462; 428/463; 428/694
[58] Field of Search ............... 428/900, 539, 328, 413, 428/418, 457, 461, 462, 463; 252/62.55, 62.54; 427/127, 128, 132; 241/16; 360/134, 135

[56] References Cited

U.S. PATENT DOCUMENTS 3,476,325 11/1969 Groszek ................................. 241/16

FOREIGN PATENT DOCUMENTS 2502657 1/1976 Fed. Rep. of Germany ........... 427/127
1522505 8/1978 United Kingdom ..................... 427/131

*Primary Examiner*—Stanley S. Silverman
*Attorney, Agent, or Firm*—Seidel, Gonda, Goldhammer & Panitch

[57] ABSTRACT

A magnetic recording medium, consisting of a base coated with a magnetic coating material, contains finely divided particles of at least either nickel or copper uniformly dispersed in the magnetic coating, in the form of primary particles obtained by pulverization of the skeletal structure of a mother salt or of an aggregated structure. In a method of manufacturing the medium, an antistatic additive, prepared by pulverizing and dispersing at least either Ni powder or Cu powder which retains the skeletal structure of a mother salt or having an aggregated structure, in the presence of a polymeric material, is mixed in the magnetic coating material.

11 Claims, 1 Drawing Figure

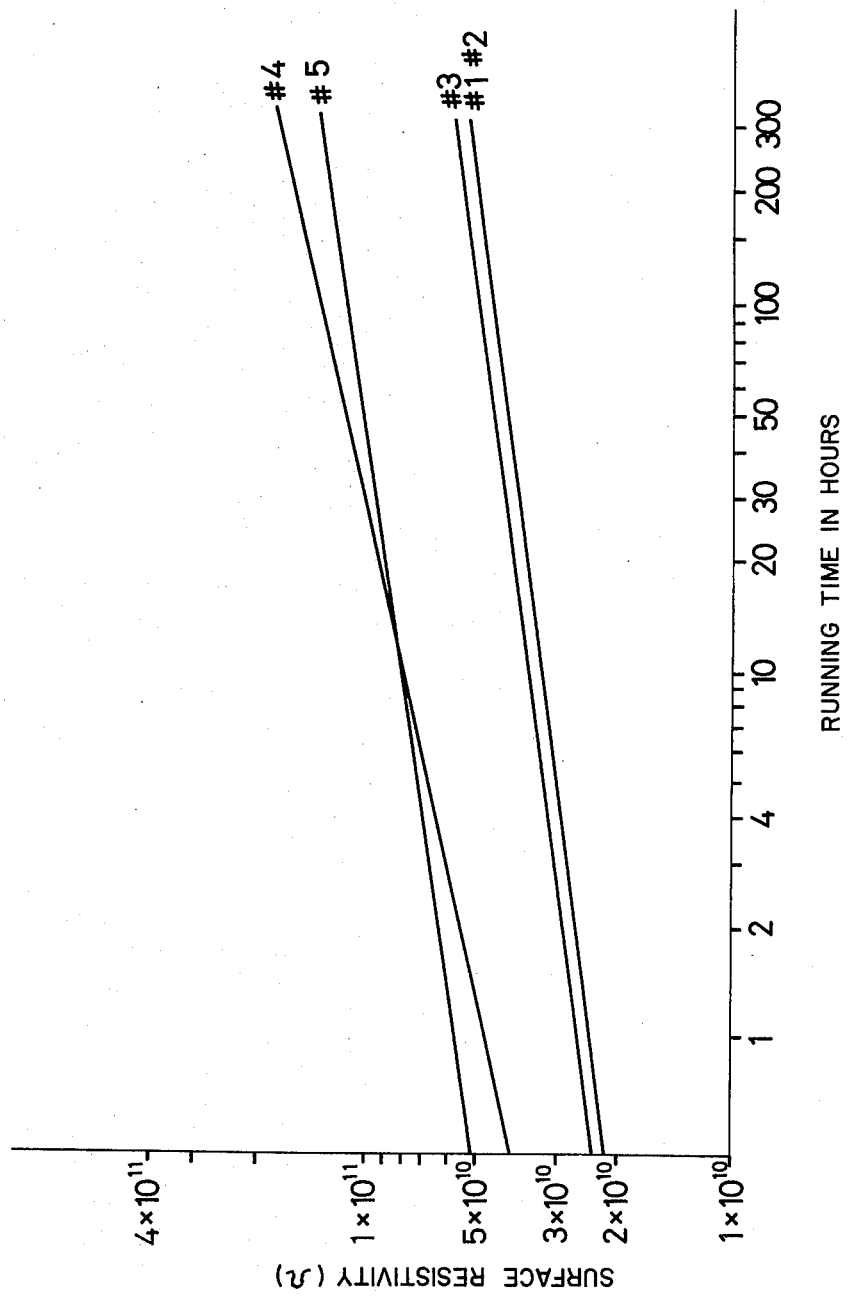

MAGNETIC RECORDING MEDIUM AND METHOD OF MANUFACTURING THE SAME

BACKGROUND OF THE INVENTION

This invention relates to a magnetic recording medium, and more specifically to such medium with an antistatic property improved by use of a binder containing at least one type of fine metal particles, of either nickel or copper, and to a method of manufacturing the same.

With the growth of their market, magnetic tapes as a magnetic recording medium have been required to attain higher quality and better characteristics. One of the inherent properties of the tapes to be improved is their tendency of being statically charged troublingly while they are running. It is a phenomenon of electric charge accumulation on tape during its movement. The charge accumulated to excess can lead to an atmospheric discharge between the tape and the guides or the head. If not so serious, the discharge noise at the time of recording or playback will constitute an uncomfortable noise to the listener, adversely affecting the tone quality of the recorded or reproduced sound. It is often the case with such an easily charged tape, especially of the thin type, that the tape portion being paid off is attracted by static adhesion to the underlying base face and, out of balance with the given tension of the tape, the tape speed becomes ununiform, causing wow and flutter in an audio tape or jitter in a video tape and thus giving unsatisfactory sound or picture quality.

When the relative speed between the tape and the head is high as, for example, at the time of high speed recording, the static charge accumulation sometimes causes the tape inadequately wound on a reel to shift edgewise out of register with, or even deflect away from, the head, especially during the course of recording. This can result in deformation, creasing, or folding of the tape or, in extreme cases, the tape gets twisted round the head or other parts and is broken.

Also, in the manufacture of the magnetic tape itself, the electrostatic difficulties in the process of application and drying of the magnetic coating material, surface finishing, and slitting bring defects in the magnetic tape material.

Attempts thus far made to overcome those difficulties have included the following:

(1) Addition of electrically conductive carbon black to the magnetic coating, in an amount from 20 to 30 wt% of the magnetic material.

(2) Addition of an antistatic agent consisting of a surface active agent to the magnetic coating.

(3) Addition of fine, hard solid particles, of the order of a micron in size, to the magnetic coating material in the process of dispersion, whereby fine solids resulting from the abrasion of steel balls as a medium of the dispersion machine are mixed into the magnetic coating.

(4) Addition of a metal salt, such as iron chloride or iron nitrate, to the magnetic coating material.

These methods improve the conditions that arise from the phenomenon of static charge accumulation but sacrifice the other characteristics of the tape. Thus, there has been no way of preventing the troubles concomitant of the phenomenon without impairing the tape characteristics.

In an effort to solve these problems, the applicant previously proposed, in copending Japanese Patent Application No. 964/78, the addition of at least one type of fine metal particles, either of nickel or copper, to a magnetic powder so as to prevent troubles affecting the tape characteristics and to avoid static charge accumulation. The cited patent application discloses a magnetic recording medium made by coating a base material with a mixture of a magnetic powder and a binder which contains at least one type of fine metal particles, either of nickel or cobalt. Definite methods which may be used in preparing the fine particles of Ni or Cu to be used for that purpose are, for example:

(a) Reduction of nickel sulfate with $NaBH_4$ or the like in an aqueous solution.

(b) Vacuum evaporation of bulk Ni lumps in a thin inert gas atmosphere of argon.

(c) Preparation of oxalate or formate of $NiSO_4$ and reduction of the salt with a reducing gas, such as hydrogen, at elevated temperature, followed by grinding of the reduction product in a ball mill.

(d) Dissolution of a nickel carbonyl compound into a solution of a polymer in a nonaqueous solvent, followed by thermal decomposition of the resulting solution.

(e) Preparation of a fine powder by spark discharge of metal pellets in light oil.

(f) Reduction of $NiSO_4$ or other Ni salt in a solution with a reducing agent, such as hydrazine hydrate or formalin.

The fine metal particles formed in those ways, when employed as antistatic agents for magnetic recording media, gave good results when adequate consideration was given to the usage. In manufacturing magnetic recording tapes using such antistatic agents of fine metal particles, each magnetic coating material to be applied on the base was prepared by mixing such an antistatic agent with a magnetic powder, a polymeric binder, and a solvent and then thoroughly mixing the resulting composition for dispersion in a ball mill for about 60 hours.

The metal particles obtained in accordance with the methods (a), (b), and (d) were superfine, even less than 500 Å in size, and when added even in small amounts they dispersed thoroughly in magnetic recording media and performed excellently as antistatic agents. However, those methods are not suited for quantity production. The reducing agent such as $NaBH_4$ used in the method (a) is expensive, and the vacuum evaporation (b) does not lend itself to mass production because of difficulties in connecting the process steps for continuous operation and in taking out the product powder. The method (d) of thermally decomposing a nickel carbonyl compound in a nonaqueous solution involves intricate process steps and calls for extra time and labor for the separation of the resulting powder. The finer the metal particles, the better the antistatic ability of the powder will be, but the more limitations each of the methods will have in respect of the process for quantity production and in the material aspect. Even though the product serves excellently as an antistatic agent, the cost factor will be a hindrance to its use on an industrial basis. The metal powder obtained in accordance with the method (e) is relatively large in size, in the proximity of 1000 Å, and is again unsuitable for mass production. The method (c) is adapted for largescale production but the powder must be much finer in size if it is to act satisfactorily as an antistatic agent. The method (f) also requires expensive agents.

The methods (a) through (f) for preparing fine metal particles are examples of the methods taught in the above-mentioned patent application. In addition to those, some other techniques for obtaining fine metal powder have already been established in the art. After all, it appears commercially advantageous to prepare metal particles first by a method already in practice for quantity production on the industrial basis or which lends itself easily to mass production, and then switch over to a method whereby the particles are ground to a desired size, typically in the range from 1000 down to 500 Å, and are uniformly distributed in the magnetic coating. The manufacturing cost will be far less than that by any single method of the prior art.

Methods suited for quantity production of the fine particles of copper and nickel include, in addition to the afore-mentioned method (c) that depends on hydrogen reduction of an organometallic salt, a method of thermally decomposing nickel carbonyl gas, a method of recovering a dendritic metal powder deposited on plates, shotting, spraying, and electrochemical deposition of Ni or Cu particles by the addition of Al or the like to a solution of a Ni or Cu salt.

After careful investigations through microscopic observation of the shape of the particles obtained in accordance with those methods, I found that the particles are mostly those retaining the skeletal structure of the mother salt and those of a secondary particle structure formed by aggregation of the primary particles. It then occurred to me that such relatively coarse particles can be pulverized, by subjection to shearing forces, to finer particles typically ranging in size from 1000 down to 500 Å. Actually, mere application of shearing forces to relatively large particles will not produce a desired pulverization effect but rather invite a blocking phenomenon to a disadvantage. For attaining the desired effect, use of a medium capable of dispersing the finely divided solids is essential. As a result of an extensive research, it has now been found that, when a mixture of such a relatively coarse starting powder with a suitable amount of a high molecular or polymeric material for paint coating use is processed on a pulverizing-dispersing apparatus capable of exercising strong shearing forces, e.g., a hot two-roll mill, pressure kneader, Banbury mixer, or a combination of a kneader and a three-roll mill, a metal fines dispersed paint polymeric material for coating will result, in which fine metal particles of a desired size, formed by pulverizing the skeletal structure of the mother salt or by pulverizing the aggregated structure, are dispersed. The paint polymeric material thus obtained is in a state such that the fine particles of the primary particle size are individually wrapped by the paint material and are throughly dispersed therein. This metalfines-dispersed paint polymeric material can be dissolved and dispersed in a solvent of great dissolving power, such as methyl ethyl ketone or cyclohexane, and then mixed into a binder for use in the ordinary process for producing a magnetic recording medium. Thus, from its nature, this fines-dispersed polymeric material may be called an antistatic additive or binder.

Examples of the paint polymeric materials are vinyl chloride-vinyl acetate-vinyl alcohol copolymers (e.g., that which is manufactured under the trade designation "VAGH" by Union Carbide Corp.), polyvinyl butyral resins (e.g., "VYXL" by Union Carbide Corp.), expoxy resins (e.g., "Epiclon H-350"), vinyl chloride-vinyl acetate copolymers ("VYHH"), vinyl chloride-vinyl acetate-vinyl propionate copolymers, polybutadiene resins, butadiene-acrylonitrile copolymer resins, vinyl acetate-ethylene copolymer resins, phenoxy resins, linear saturated polyester resins (e.g., "Vylon V-300" and "Vylon V-200" by Toyobo Co.), and polyurethane resins (e.g., "Estane-5701, -5703, and -5707" by B. F. Goodrich Chemical Co. and "Nipporan 3022 and 5032" by Nippon Polyurethane Co.).

Importance is given to the compounding ratio of the fine metal particles and the polymeric material in an antistatic binder. If the proportion of the metal powder is less than 50% by weight, the shearing forces will not effectively propagate to the powder, failing to create an adequate pulverizing action. Conversely if the metal powder accounts for more than 95% of the total weight of the binder, insufficiency of the dispersion medium to effect the solids dispersion will rather cause blocking of the metal particles. For these reasons the proportion of the metal powder is desired to be between 50 and 95% of the total binder weight.

The advantages derivable from the use of the antistatic binder developed under this invention are as follows:

(1) Reduction of the cost is made possible by use of the coarse metal particles being mass produced on the industrial basis.

(2) Since the fine particles of Ni or Cu are ground to the size of primary particles and dispersed in the paint polymeric material, the properties of the binder as an antistatic agent are improved. Moreover, because a small addition is enough for that purpose, the electromagnetic conversion characteristic of the magnetic recording medium itself is not sacrificed.

(3) The fine metal particles, already dispersed as wrapped by the paint polymeric material, need no redispersion as by employing a ball mill. Furthermore, mere dissolution of the antistatic binder in an organic solvent permits easier dispersion of the fine metal particles contributing to great efficiency for the process of producing a magnetic recording medium.

(4) Being dispersedly wrapped in the polymeric material, the fine metal particles are protected from catching fire due to oxidation.

The magnetic recording medium made with use of this antistatic binder differs from the conventional Ni- or Cu-containing magnetic recording media in that the antistatic fine particles of Ni or Cu metal are uniformly dispersed in the magnetic coating layer in the form of minute particles formed by pulverization to the degree that the skeletal structure of the mother salt is no longer retained, or by disintegration of the aggregated structure.

The single FIGURE in the accompanying drawing is a graph showing the relations between the running time and surface resistivity of magnetic tapes made in accordance with this invention and the tapes specifically made for comparison purposes.

The invention is illustrated by the following examples.

EXAMPLE 1

(1) Two different saturated aqueous solutions each containing one mole of $NiSO_4.6H_2O$ or oxalic acid $(H_2C_2O_4.2H_2O)$ were prepared and then mixed at 60° C. for a reaction. Ten minutes after the start of the reaction, an oxalate, $Ni(COO)_2.2H_2O$, precipitated. The precipitate was washed with water to a pH value of nearly 6 and was dried. The resultant was about 100 μm in particle size. Next, this nickel oxalate was reduced in a hydrogen gas stream at 350° C. for 5 hours. After the reduction it was moistened with toluene and taken out, and the toluene was evaporated off by natural drying, leaving nickel metal particles behind. The particles retained the skeletal structure of the mother salt by sintering of primary particles about 8000 Å (0.8μ) in size.

(2) To 70 parts by weight of such Ni metal particles were added 30 parts by weight of "VAGH" (the trade designation of a vinyl chloride-vinyl acetate-vinyl alcohol copolymer made by Union Carbide Corp.) and then 1.2 parts by weight of methyl isobutyl ketone (MIBK). The components were mixed by a powder mixer, and a powder mixture in which the copolymer was somewhat moistened resulted. It was found effective in preventing the oxidation as well as in improving the dispersibility of the Ni metal powder to add sorbitan monolaurate or suchlike surface active agent and a silane coupling agents having a reducing action, such as γ-aminopropyltriethoxysilane or N-β-(aminoethyl)γ-aminopropyltrimethoxysilane, in the form of a solution in MIBK, in an amount of about 2% by weight on the basis of the weight of the metal powder.

Using a hot two-roll mill kept at 60° C., the metal powder mixture was pulverized and kneaded by the rolls held with a gap of 0.5 mm in between. After 10 or so kneading runs, a sheet of antistatic binder as a mixture of finely divided Ni metal particles and vinyl chloridevinyl acetate copolymer was obtained. The MIBK was evaporated off by the heat of mixing. As already stated, the compounding ratio of the metal powder and "VAGH" was a factor of importance. When the proportion of the metal powder was less than 50% by weight, the powerful shearing forces of the hot two-roll mill would not act adequately in the pulverization of the metal particles. Together with the "VAGH" softened with heat, the metal particles escaped through the roll gap, reducing the efficiency of pulverization to primary particles and dispersion as such. Conversely, when the metal powder proportion exceeded 95% by weight, the roll grinding was no longer possible due to deficiency of the dispersion medium, and rather the metal particles were blocked by a rolling effect. It appeared that the metal particles were properly pulverized and dispensed by the propagation of shearing forces by the hot two-roll mill and by the development of forces out of mutual impingement of the particles.

The sheet thus obtained was chipped to a pellet form by a slitter for forming color chips.

(3) In a mixer 4.3 parts of the pellets (containing 3 parts Ni) obtained by the above procedure (2) was mixed with 3 parts of methyl ethyl ketone to prepare a lacquer in which superfine particles of Ni were dispersed. Observation with the aid of an electron microscope revealed that the average size of the superfines was close to the size of primary particles, i.e., 500 Å.

Then, a magnetic coating material for ordinary magnetic recording tape was prepared by mixing and dispersing the following composition in a ball mill:

| | | |
|---|---|---|
| γ-Fe₂O₃ | 300 | parts by weight |
| "VAGH" | 80 | |
| Nitrile rubber ("Hycar 1432J" by Nippon Zeon Co.) | 20 | |
| Lecithin | 2 | |
| Stearic acid | 1 | |
| Ni-powder-dispersed lacquer | 4.3 | (in terms of pellets) |
| Solvent mixture (MEK:MIBK:toluene = 1:1:1) | 600 | |

The magnetic coating material so prepared was applied on a 12μ-thick polyester film base to form a magnetic coating 7μ in thickness. The coated film was finished on the surface to a total thickness of 18μ. The film was then slitted to a width of 3.8 mm each to form a cassette tape. The tape obtained in this way is called Specimen #1 for the purposes of the invention.

EXAMPLE 2

(1) Thirty parts by weight of a polyvinyl butyral resin ("VYXL" by Union Carbide Corp.) was added to 70 parts by weight of a mixture of metallic nickel powders, which are formed by thermal decomposition of nickel tetracarbonyl (Ni(CO)₄) gas and are marketed by Inco Co. under the trade names of "Type 123" (average particle size 3.0–7.0μ), "Type 255" (2.2–3.0μ), and "Type 287" (2.6–3.3μ). After further addition of 1.2 parts by weight of methyl isobutyl ketone (MIBK), the mixture was placed in a pressure kneader. The charge was mixed at a speed of 50 rpm for 5 minutes without the application of any pressure and then kneaded and ground at a speed of 35 rpm for 20 minutes under the pressure of 4–5 kg/cm² with a pressure cover. The temperature of the charge in the kneader was kept within a range of 50°–80° C. by means of a water-cooling jacket. Following the conclusion of kneading, the charge was taken out of the kneader and, after removal of the MIBK by evaporation, the product was broken into pellets.

(2) 4.3 parts of the pellets (containing 3 parts nickel) obtained in step (1) was added to 3 parts of methyl ethyl ketone and placed together in a mixer for mixing and dissolution. A lacquer with fine particles of nickel dispersed throughout was obtained. The average size of the dispersed nickel fines was approximately 800 Å.

Next, a magnetic coating material was prepared by mixing and dispersing the following composition in a ball mill for 60 hours:

| | | |
|---|---|---|
| γ-Fe₂O₃ | 300 | parts by weight |
| "VAGH" | 80 | |
| Urethane rubber "Estane 5701" | 20 | |
| Lecithin | 2 | |
| Stearic acid | 1 | |
| Ni-superfines-dispersed lacquer | 4.3 | (in terms of pellets) |
| Solvent mixture (MEK:THF:toluene = 2:1:1) | 600 | |

Immediately before the application of the magnetic coating material thus formed, 15 parts of "Desmodur L" (the trade designation of an adhesive having 75% solid contents sold by Farbenfabriken Bayer AG.) was added. Using this mixture and following the procedure described in Example 1, a cassette tape was made. It is called Specimen #2.

EXAMPLE 3

(1) 75 parts by weight (30 parts by weight in terms of solid matter) of "Epiclon H-350" (with 40% solid contents), which is a mixture of a high-molecular epoxy resin with methyl isobutyl ketone (MIBK), was added to 70 parts by weight of fine copper powder ("CE-5"

made by Fukuda Metal Ind. Co.) with an average size of 7μ recovered from an electrolytic deposit of dendritic structure on electrodes upon re-electrolysis of high purity electrolytic copper. The mixture was placed in a kneader. During the kneading, sufficient heat developed to remove the solvent contents by evaporation. In order to prevent chemical deterioration of the epoxy resin, the kneader temperature was controlled by water cooling with the jacket so that the charge inside was kept in the range of 60°–80° C. Dispersion was effected while the solids concentration was gradually increased by evaporating MIBK out of the epoxy resin. After the temperature rise to 60° C., the dispersion was continued for one hour. MIBK still remained in the treated mixture, in an amount equivalent to 5 parts by weight of the total weight.

The charge was taken out of the kneader and was subjected to five kneading runs in a three-roll mill to grind and disperse the resulting copper powder of dendritic structure and evaporate the residual MIBK. Finally a sheet of copper-fines-dispersed body was obtained. The sheet was allowed to dry until the slight residual amount of MIBK almost completely evaporated, and then the product was pelletized by a color chip slitter.

(2) A copper fines-dispersed lacquer was obtained by adding 3 parts of methyl ethyl ketone to 4.3 parts of the pellets formed in the step (1) above and then mixing and dissolving the mixture by means of a mixer. The average size of the fine copper particles was about 900 Å.

Next, in order to prepare a magnetic coating material for magnetic tape by use of this lacquer, the following composition was mixed and dispersed in a ball mill for 60 hours:

| | |
|---|---|
| Co-containing -$Fe_2O_3$ | 300 parts by weight |
| "Epiclon H-350" | 200 |
| Urethane rubber ("Estane 5701") | 20 |
| Lecithin | 2 |
| Stearic acid | 1 |
| Copper-fines-dispersed lacquer | 4.3 (in terms of pellets) |
| Solvent mixture (MEK:THF:toluene = 2:1:1) | 600 |

The separate coating material thus obtained was employed, and 15 parts of "KOLONETOHL" (made by Nippon Polyurethane Co.) was added immediately before coating, and a cassette tape was made in conformity with the procedure of Example 1. It is called Specimen #3.

For comparison in characteristics with Specimens #1–3 formed in accordance with Examples 1 to 3, the following two tapes were made additionally.

COMPARATIVE EXAMPLE 1

A tape was made in exactly the same manner as described in Example 1, except that the antistatic agent was replaced by 12 parts by weight, in the solid form, of "Furnace Black MA-600", an electrically conductive carbon black manufactured by Mitsubishi Chemical Industries, Ltd. The tape is called Specimen #4.

COMPARATIVE EXAMPLE 2

A tape was made by using three parts by weight of the secondary nickel metal particles, or aggregates of the primary particles retaining the skeletal structure of the mother salt, obtained in the step (1) of Example 1, directly without subjection to the pulverization by the two-roll mill as in the step (2), in place of the Ni-powder-dispersed lacquer in the step (3). This tape is called Specimen #5.

With these five test pieces, Specimens #1–3 (Examples) and Specimens #4–5 (Comparative Examples), tests were conducted by allowing each to run reciprocatingly without interruption on a cassette type car stero deck ("Model CX-1147D" mfd. by Matsushita Communication Ind. Co.). The relations between the running time and surface resistivity of the tapes were as plotted in the accompanying drawing. Usually the magnetic tapes with surface resistivities exceeding $4 \times 10^{11} \Omega$ tend to develop wow and flutter, with a danger of discharge noise. This is particularly true with cassette tapes of thin films, e.g., C-90 and C-120. The tapes according to this invention showed little increases of their surface resistivities, the values being of the order of $5 \times 10^{10} \Omega$ after an uninterrupted run of 300 hours. Thus, despite the fact that they contained only one fourth of the conductive carbon black used in the tape #4, the tapes #1–3 of the invention displayed negligible increases in their surface resistivities, indicating that they are extremely stable against static troubles. With Specimen #5, the surface resistivity which was of the order of $10^{10}\Omega$ at the start of running rose to the level of $10^{11}\Omega$ in 50 hours and up to $1.5 \times 10^{11} \Omega$ in 300 hours. Perhaps such unsatisfactory characteristic of Specimen #5 is due to the fact that Specimen #5 is similar to Specimens #1–3 in the content in terms of Ni metal but uses the aggregates of primary particles not subjected to the pulverization of Ni particles by shearing action. In spite of the fact that the Ni metal powder of #5 was subjectd to the mixing and dispersing functions exerted by a ball mill in the course of preparation of a magnetic coating material, it appeared that the dispersing functions produced by the ball mill were not powerful enough to pulverize the Ni particles and the latter was introduced in the unpulverized form of aggregated secondary particles into the magnetic coating, with the consequence that the Ni particles in the tape failed to exhibit the conductivity essential for the antistatic action of the tape. This was confirmed by observation with an electron microscope and an analysis by an X-ray microanalyzer.

In the graph were represented the test results with samples of audio tapes, specifically of cassette tapes which are particularly susceptible to electrostatic adhesion. Likewise, the problems that arise from static charge accumulation are, from the viewpoint of reliability assurance, matters of important concern in the art of magnetic recording with all kinds of media, including video and computer tapes, and magnetic sheets, cards, and discs. In particular, with a medium such as the video tape that handles short-wavelength recording signals with a minimum recording wavelength of nearly one micron, the amount of the solid antistatic agent to be contained in the tape must be as small as feasible lest it have an adverse effect on the dispersing and filling properties of the magnetic iron oxide. It is equally important that a buildup of static charge in the tape should not attract dirt from around and that the magnetic coating be protected against adhesion of the dust chipped off from the abrasion of the undersurface of tape base. In the following table are summarized the sensitivities at low frequencies, MoL (dB) and S/N (dB) characteristics of the tapes #1–5. It will be seen from the table that the tapes using the antistatic binder according to the invention are superior in electromagnetic conversion characteristics, too. The tape #4, as already states, uses carbon black as an antistatic agent. In order to maintain its chain structure in the magnetic coating, the carbon black must be added in an amount more than four times greater than that of the nickel powder in the specimens of the invention to keep the surface resistivity not higher than $4 \times 10^{11} \Omega$. A mere glance on the table shows the unfavorable effects of such large addition of the antistatic agent.

TABLE

| Speciman # | Audio sensitivity (dB) | | | Mol (dB) | S/N (dB) |
|---|---|---|---|---|---|
| | S-333Hz | S-8KHz | S-12.5KHz | 333 Hz | 1 KHz |
| 1 | +1.0 | +0.9 | +1.5 | +1.0 | 55 |
| 2 | +0.8 | ±0.8 | +1.3 | +1.0 | 55 |
| 3 | +0.7 | +0.8 | +1.2 | +0.9 | 55 |
| 4 | −1.5 | −0.5 | −0.2 | −3.0 | 52.5 |
| 5 | +0.5 | 0.0 | +0.5 | 0.0 | 53.5 |

Notes:
Measurement conditions :
Deck : "Nakamichi CT-20A"
Tape speed : 4.76 cm/sec.
Input : 30 dB
Bias : 0.85 mA
Ref tape : TDK's "STD Tape"

What is claimed is:

1. A method of manufacturing a magnetic recording medium by applying a magnetic coating material containing a magnetic powder and a binder on a base, characterized in that an antistatic additive, prepared by pulverizing and dispersing at least either nickel powder or copper powder which has the skeletal structure of a mother salt or having an aggregated structure, in the presence of a polymeric material, said pulverizing being effected by the exertion of a shearing force of a sufficient magnitude such that the skeletal structure is no longer retained or the aggregated structure is disintegrated, is mixed in said magnetic coating material.

2. A method according to claim 1, in which said antistatic additive is dissolved in a solvent and is added in the form of a lacquer.

3. A method according to claim 1, in which said metal powder accounts for from 50 to 95% of the total weight of said antistatic additive.

4. A method according to claim 1, in which the starting powder for the preparation of said antistatic additive is formed by hydrogen reduction of an organic nickel salt, thermal decomposition of nickel carbonyl gas, recovery of a dendritic powder deposited on plates by electrolysis, shotting, spraying, or electrochemical precipitation from a Ni or Cu salt solution.

5. A method according to claim 1, in which the pulverizing and dispersing action is given by a grinding and dispersing apparatus capable of exerting strong shearing forces.

6. A method according to claim 5, in which said grinding and dispersing apparatus is selected from among a hot two-roll mill, pressure kneader, Banbury mixer, and the combination of a kneader and a three-roll mill.

7. A magnetic recording medium made by the process of claim 6.

8. A magnetic recording medium according to claim 7 wherein said magnetic powder comprises particles of a magnetic oxide.

9. A magnetic recording medium according to claim 7 wherein said polymeric material is of the type used for paint coating.

10. A magnetic recording medium according to claim 7 wherein said nickel powder or copper powder is in the form of finely divided particles having particle diameters predominantly in the range of about 500–1000 Å.

11. A magnetic recording medium made according to the process of claims 2, 3, 4, 5 or 6.

* * * * *